INVENTORS
KAREL H. MICGIELSE
ARNOLDUS J. REIJNDERS
By Cushman, Darby & Cushman
ATTORNEYS

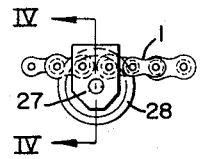
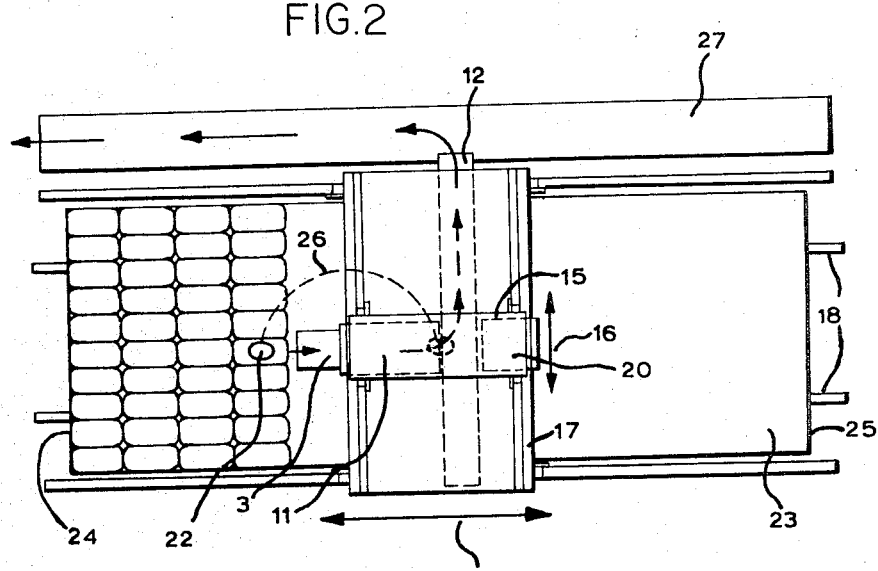
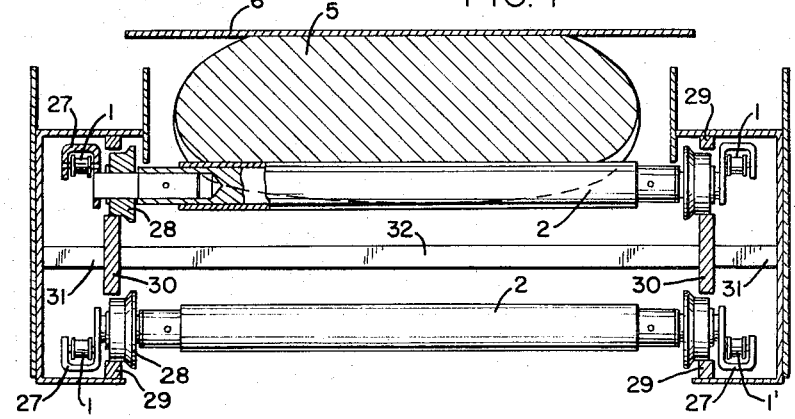

United States Patent Office 3,339,710
Patented Sept. 5, 1967

3,339,710
ENDLESS CONVEYOR
Karel H. Micgielse, Heerlen, and Arnoldus J. Reijnders, Voerendaal, Netherlands, assignors to Stamicarbon N.V., Heerlen, Netherlands
Filed May 21, 1965, Ser. No. 457,549
Claims priority, application Netherlands, May 21, 1964, 64—5,624
3 Claims. (Cl. 198—160)

The present invention relates to an endless conveyor for transporting deformable objects, such as filled bags or the like, from one level to another. More specifically, the invention relates to improvements in endless conveyors of the double wall type for raising and lowering deformable objects from one plane to another through a steep or vertical slope.

The invention is particularly concerned with improvements in the handling of bags and flexible containers filled with granulated materials, powders and the like, that are relatively flexible or deformable in package form. The packaging material, i.e., a bag or the like, may be made of paper, synthetic material, or from various types of fiber or cloth material. The bags may contain, for example, from 25 to 50 kilograms of fertilizer, cement, or other powdered or granular material.

Conveyors for such deformable objects are known in the art and have been used typically in the loading and unloading of railway cars, ships and the like. The horizontal path of transport in a railway car or in the hold of a ship must in most cases be as short as possible, while the vertical path of transport is often proportionately long. Especially in the case of transporting filled bags of granular and/or powdered materials, the presently known conveyor installations have not provided a satisfactory solution, for reasons that will be evident hereinbelow.

The most common presently known conveyor systems are those of the double wall type and those of the carrier type. In the double wall type, two parallel conveyor belts in registration with one another, and moving in the same direction, are adapted to contact each side of a package for movement in any given direction.

In the case of steep slopes and vertical passageways, it has been found difficult to hold filled bags between the two parallel conveyor belts of the double wall conveyor, and it has been necessary to apply a considerable clamping force against the two conveyor belts because of the low degree of friction between the belts and the bags, particularly in the case of bags made from paper or synthetic materials. In addition, the filled bags are subjected to the rolling action of the conveyor belt idlers, as a result of which the packaging is liable to get damaged. Further, an installation comprising two belts takes up a great deal of space, requires a large capital investment, and is heavy and cumbersome. The heavy weight of such units is objectionable because the installation has to be shifted frequently to keep it close to the place where the bags are lying, or close to where the bags are to be placed.

A conveyor provided with carriers, e.g., plates or buckets, such as a bucket elevator, has the drawback that the bags cannot be deposited on the conveyor at random. Consequently, loading has to be done with great accuracy. This requirement is difficult to meet, especially if there are no operators in the railway car or ship during unloading, and the bags are placed on the conveyor, for instance, by a pneumatic appliance or other mechanical means not readily susceptible to accurate and precise movement without manual guidance.

There is thus a clearly demonstrated need in the art for improvements in the art of transporting deformable objects along steeply inclined or vertical paths.

It is therefore a principal object of this invention to provide an improved endless conveyor for transporting deformable objects through steeply inclined and vertical paths, that will not be subject to the defects of prior art structures.

It is another object of this invention to provide an endless conveyor having a carrying surface defined by elevations and recesses acting in cooperation with a smooth walled device for holding deformable objects therebetween.

Other and further objects of this invention, together with an appreciation for the advantages thereof, will become increasingly apparent as this description proceeds.

In satisfying its objectives, the invention provides a surprisingly simple solution to the foregoing problems, and obviates all the aforementioned drawbacks. This has been achieved in that the carrying surface of the conveyor according to the invention, is provided with elevations and/or recesses which slightly deform the bags, while a smooth-walled device is provided opposite steep and vertical sections of the conveyor to hold the bags against the conveyor.

According to the invention, it has been discovered that a slight deformation of the bag suffices for the bag to be carried along a vertical path without slipping, and that a small clamping force will be sufficient to hold the bag against the conveying surface. Typically, the deformation is caused by the weight of the bag when the latter is placed on a short horizontal section of the conveyor.

According to a preferred embodiment of the invention, the carrying surface consists of transverse bars, supported between flexible side members which may consist, for example, of two endless chains. The transverse or cross bars may then be fastened at equal distances therebetween in such a way that every bag is supported by a number of bars. Four bars are normally preferred, although only two or three bars may be satisfactorily employed. Larger numbers of cross bars or openings are also suitable. In the case of a wire mesh conveying surface, there would be the equivalent of a great many bars. It is often recommendable to cover the bars with an elastic material, such as rubber, or a synthetic plastic to prevent damage to the bags.

Preferably, the smooth wall device or wall means employable herein comprises one or more smooth wall sections which are adapted to move toward and away from the carrying surface of the conveyor, the degree of displacement from the carrying surface depending on the thickness of the objects to be transported. As a result, the clamping pressure exerted by the walls will be increased only slightly, if at all, by a bag which is thicker than normal. If no bags are present between the walls and the conveyor, the walls are kept in their position of rest, for instance by springs, weights, bellows or the like biasing devices.

If the walls are stiff, and the vertical path of transport is long, the walls may be divided into separate short sections to prevent the conveyor from losing its grip on a thin bag between thick bags which could occur if the distance between the wall and the carrying surface of the conveyor became too large. The walls may also be made of flexible material if special conditions warrant the resulting increased resistance that would be experienced by the bags.

The invention will now be elucidated with reference to the drawings, which show a preferred embodiment, and wherein:

FIGURE 2 is a schematic diagram in plan view showing an embodiment wherein a conveyor according to the invention is suspended from a mobile installation in the nature of a travelling crab;

FIGURE 3 is a fragmentary side elevation view of the conveyor showing a section of the conveyor chains at a transverse bar; and FIGURE 4 is a sectional view of the conveyor substantially along the line 3—3 of FIGURE 3.

Figure 1:
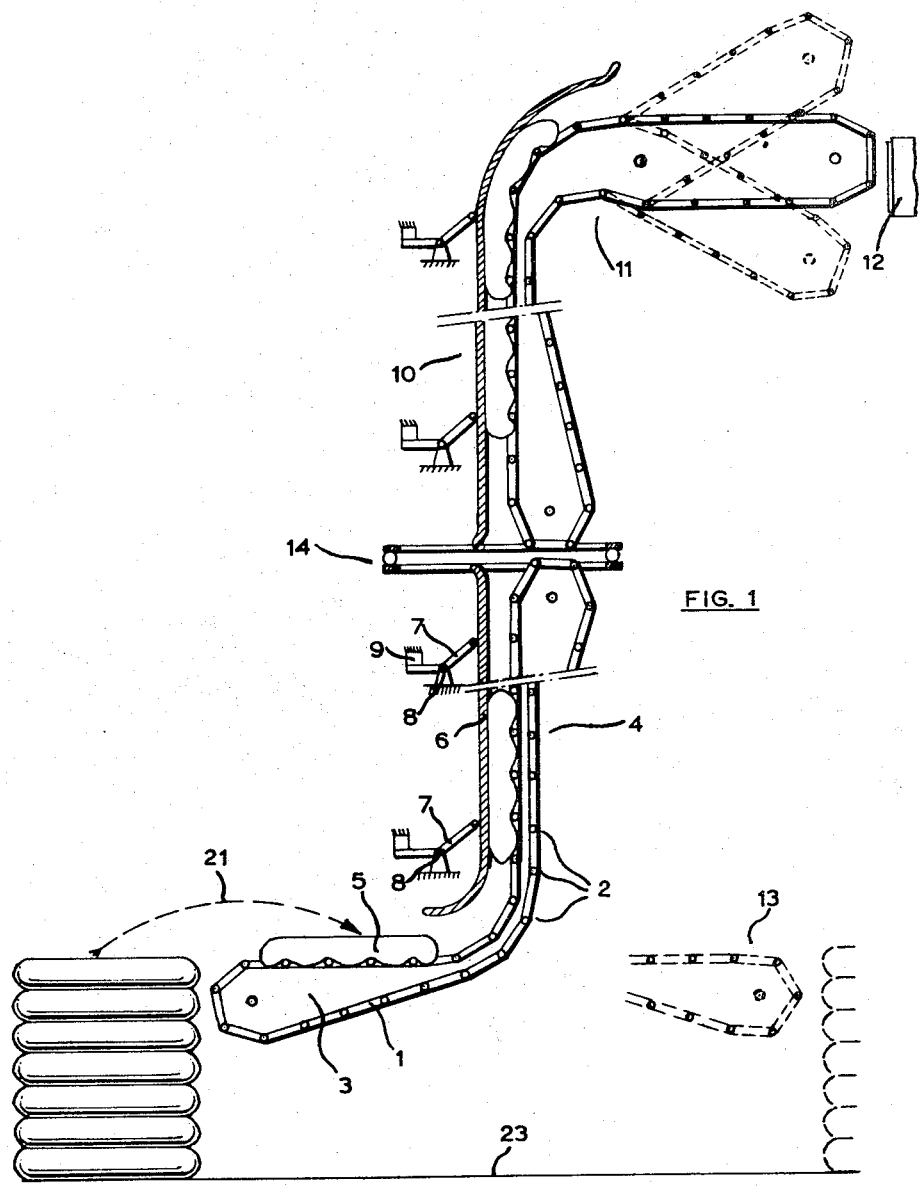
FIGURE 1 is a vertical sectional view through a conveyor according to the invention that is designed for the transport of bags from a lower level to a higher level.

The endless conveyor shown in FIGURE 1 is formed by two chains 1, which are connected to each other by means of transverse bars 2. The sectional view of the conveyor in the figure is taken across the transverse bars, so that only one chain can be seen. The lower conveyor comprises a horizontal section 3, on which the bags are placed or from which the bags may be delivered, and a vertical section 4. Owing to the weight of the bag 5, the underside of the bag 5 is deformed by the transverse bars a plurality of times to produce a shape in cross-section resembling that of a caterpillar.

The continuously driven conveyor takes the bags from the horizontal section up into the vertical section 4. Because of the manner in which the bags are deformed, they cannot glide downwards perpendicularly in the vertical section 4 as long as they are prevented from falling away from the conveyor surface. To this end, it is necessary to exert a light horizontal pressure on the bags to prevent them from moving away from the conveyor and thus prevent the bags from falling down. This light pressure is exerted by a smooth wall 6. This wall is pivotably attached to levers 7, which in turn are mounted on fixed fulcrums or pivot points 8. At least one of the levers 7 coacts with a stop 9, which determines the extreme forward position of the wall 6 if no bags are present between the wall and the conveyor.

The walls 6 could, if desired, rest against the conveying surface. Usually however, the "at rest" distance between the walls and conveying surface will be predetermined to the extent that no special adjustments are necessary to start up the device when introducing a first bag. The "at rest" distance can also be varied as needed to compensate for different bag thicknesses. In any event, the weight of the wall 6 is such that the bags are held against the conveyor. Because of this simple construction, there is no necessity for any complex biasing or horizontal pressure producing devices. Since the wall 6 is capable of being moved aside against the force of gravity, the bags are subjected only to the required light pressure and are not clamped to such a degree as to get damaged.

It is to be understood that the conveyor according to the invention can be a single unit, or composed of a plurality of conveying units. In the case of a single unit, the conveyor 4 could have an S shape, of the sort generally indicated in FIGURE 1, to provide loading and unloading zones at either end. In such case, the wall 6 may be a single unit also having an S shape of the sort generally indicated in FIGURE 1, or could be composed of two or more separate units, denoted by the reference numerals 6 and 10, in the case of a conveyor of extended vertical height.

The latter structure is suitable for use in the embodiment shown in FIGURE 2 wherein an upper conveyor is provided, which is supplied with bags by the first conveyor. Intermediate vertical conveyor sections and wall sections can be interposed between such upper and lower conveyors to permit increased height. The vertical section 10 of the upper conveyor is arranged in line or in registration with the vertical section 4 of the lower conveyor. The upper conveyor is also provided with an adjustable horizontal section 11 which is capable of being pivoted in a vertical plane, as indicated by the broken lines. The section 11 is adapted to deliver the bags onto a conveyor belt 12, or to receive bags therefrom in the case where it is desired to lower bags from an upper level to a lower level without damage.

During operation, either conveyor can be turned through 180° in relation to the other conveyor. The reversed position 13 of the lower conveyor is indicated by broken lines in FIGURE 1. Reversal is brought about with the aid of a ball race 14. Plural ball races could be provided in a construction embodying intermediate conveyors.

The installation shown in FIGURE 1 is preferably suspended from a carriage 15, as is schematically shown in FIGURE 2. The carriage 15 can travel over a second carriage 17 in the direction indicated by the arrow 16. The latter carriage 17 can travel, in the direction indicated by the arrow 19, under a roof construction high over a railway track 18.

The installation shown in FIGURE 1 can be mounted such that it may be lifted in relation to the carriage 15 to allow passage of a train therebelow. It may also be necessary for the lower horizontal section 3 to be raised at the beginning of the unloading operations. This may be accomplished by raising and lowering the whole conveyor, by making the horizontal section 3 pivotable like the section 11, or by turning the above-mentioned pivotable section 11. The height of the end of the section 11 can be changed to cooperate with the height of the conveyor 12, as is indicated by the broken lines.

Also in the installation shown in FIGURE 2, an operator's cabin 20 can be provided, together with a pneumatic appliance for grabbing, moving and depositing the bags from the stacks shown, onto the horizontal section 3 of the conveyor, as indicated by the arrow 21 in FIGURE 1. The pneumatic appliance and cabin 20 can be attached to the carriage 15. The only part of the pneumatic appliance shown in FIGURE 2 is a suction head, indicated at 22, for lifting the bags.

In unloading a railway car 23, the direction of working is towards one of the two head walls 24 or 25 of the car. Carriage 15 is continuously moved from one side of the car to the other, while carriage 17 is shifted lengthwise of the car when carriage 15 is in one of the side positions, after having removed an entire row of stacked bags. During this movement, the pneumatic appliance and lower conveyor section 3 are in front of carriage 17. It would be difficult to start unloading near either end wall of the railway car, or in a ship's hold, since working space would be limited. Unloading is therefore usually started in the center, working to first one end, and then towards the other.

When the railway car has been unloaded as far as the head wall 24, the lower conveyor is then turned through 180°, so that conveyor section 3 takes up position 13, shown in FIGURE 1. The pneumatic appliance 22 turns with the conveyor, as is indicated by the line 26 in FIGURE 2. The part of the load near the head wall 25 can then be removed from the railway car with automatic facility.

One illustration of the interconnection of the conveyor chains by transverse bars as shown by way of example in FIGURES 3 and 4. The transverse bars 2 are fixedly secured at opposite ends to opposed chain links 27. The bars 2 mount rotatable guide wheels 28 which run in sleeves defined by upper strips 29 and lower strips 30 maintained in desired relationship by distance bars 31 and 32.

It is to be understood that the invention is not restricted to the embodiments described above, but is susceptible to various changes that will be apparent to those skilled in the art. For example, the smooth wall 6 need not be movable parallel to itself but can be permanently fixed in the case of bags of a given thickness. Also, the wall 6 may be formed by parallel strips, each of which can move aside separately. The wall 6 can also be formed from a flexible plastic membrane.

Instead of transverse bars, wire mesh, a belt provided with ridges, knobs, or the like, may be used as the carrying surface of the conveyor. The transverse bar construction is, however, preferred. The conveyor may also be provided with suction heads. It is also to be understood that the conveyor herein may be modified in such a way as to be reversibly suited for downward transport.

Accordingly, the invention should only be limited by the appended claims.

What is claimed is:

1. Apparatus for transporting a deformable object having two opposite faces, such as a flexible-walled bag filled with flowable material, from a first level to a second level, comprising: means defining an uneven carrying surface movable throughout a two-segment path wherein during a first segment the uneven carrying surface is generally horizontal and upwardly presented and a second segment the uneven carrying surface is generally steeply canted and faces generally horizontally; means for moving said uneven carrying surface throughout said path including means for canting said uneven carrying surface at the juncture of said first and second path segments; means defining alternating projections and recesses on said uneven carrying surface proceeding transversely thereof and spaced from one another longitudinally thereof respecting said path; successive projections and recesses being closer to one another than the length of one face of said deformable object; said uneven carrying surface being constructed and arranged to receive said deformable object facewise within the first segment of said path and to deform the one face of said deformable object presented thereagainst into substantial conformance with a plurality of said projections and recesses under the force of the weight of said deformable object on the uneven carrying surface within said path first segment; means defining a smooth wall arranged adjacent the second segment of said path and being substantially coextensive therewith; said smooth wall being constructed and arranged to face said uneven carrying surface throughout the second segment of the path thereof; means maintaining said smooth wall so close to said path second segment as to engage the opposite face of said deformable object from said one face sufficiently to prevent substantial relative longitudinal slippage between the deformed deformable object one face and said uneven carrying surface during said path second segment yet allow sliding movement of said deformable object opposite face along said smooth wall; means defining a second uneven carrying surface movable throughout a second two segment path wherein during a lower first segment the second uneven carrying surface is generally steeply canted and faces generally horizontally and an upper second segment the second uneven carrying surface is generally horizontal and upwardly presented; means for moving said second uneven carrying surface throughout said second path including means for canting said second uneven carrying surface at the juncture of said second path first and second segments; means defining alternating projections and recesses on said second uneven carrying surface proceeding transversely thereof and spaced from one another longitudinally thereof respecting said second path; successive projections and recesses being closer to one another than the length of one face of said deformable object; said second uneven carrying surface being constructed and arranged above and in longitudinal alignment with the second segment of the path of the first-mentioned uneven carrying surface to receive said deformable object facewise from the first-mentioned uneven surface at the lower end of the first segment of the path of said second uneven carrying surface and to receive the face of said deformable object presented thereagainst in substantial conformance with a plurality of said projections and recesses; means defining a second smooth wall arranged adjacent the first segment of said second path and being substantially coextensive therewith; said second smooth wall being constructed and arranged to face said second uneven carrying surface throughout the second path first segment; means maintaining said smooth wall so close to said second path first segment as to engage the opposite face of said deformable object from the face received by said second uneven carrying surface sufficiently to present substantial relative longitudinal slippage between the deformed face of the deformable object and said second uneven carrying surface during said second path first segment yet allow sliding movement of said deformable object opposite face along said second smooth wall; and means supporting said first mentioned and said second uneven carrying surface and maintaining said first mentioned uneven carrying surface path second segment in longitudinal alignment with the first segment of said second path; said supporting and maintaining means being constructed and arranged to provide at least 180 degrees of relative rotation between the first-mentioned uneven carrying surface with respect to the second segment of the path thereof and the second uneven carrying surface with respect to the first segment of the path thereof.

2. The apparatus of claim 1 wherein said first-mentioned uneven carrying surface comprises a pair of laterally spaced, parallel conveyor chains and a plurality of longitudinally spaced transverse bars, each secured at opposite ends thereof to both of said conveyor chains.

3. The apparatus of claim 1 further including traveling crab means suspendingly supporting said first mentioned uneven carrying surface throughout the path of movement thereof.

References Cited

UNITED STATES PATENTS

| 758,739 | 5/1904 | Culp | 198—88 |
|---|---|---|---|
| 836,435 | 11/1906 | Chapie | 198—195 X |
| 846,725 | 3/1907 | Brown et al. | 198—195 X |
| 1,193,118 | 8/1916 | Busk | 198—28 |
| 1,498,914 | 6/1924 | Hoffman | 198—160 |
| 2,286,250 | 6/1942 | Albertoli | 198—160 |
| 2,373,162 | 4/1945 | Brechtel | 198—1 |
| 2,490,381 | 12/1949 | Shields | 198—88 |
| 2,529,620 | 11/1950 | Marnach et al. | 198—160 X |
| 2,785,810 | 3/1957 | Kneib | 198—160 |
| 3,069,027 | 12/1962 | Dischinger | 198—36 X |
| 3,182,782 | 5/1965 | Beiler et al. | 198—171 |

FOREIGN PATENTS 801,447  9/1958  Great Britain.

EVON C. BLUNK, *Primary Examiner.*

M. L. AJEMAN, *Assistant Examiner.*